Nov. 6, 1923.

O. COOPERMAN 1,473,017

BICYCLE TRANSMISSION

Filed June 15, 1921

INVENTOR.
OSCAR COOPERMAN.
BY Chas. E. Townsend
ATTORNEY.

Nov. 6, 1923.
O. COOPERMAN
1,473,017
BICYCLE TRANSMISSION
Filed June 15, 1921
2 Sheets-Sheet 2
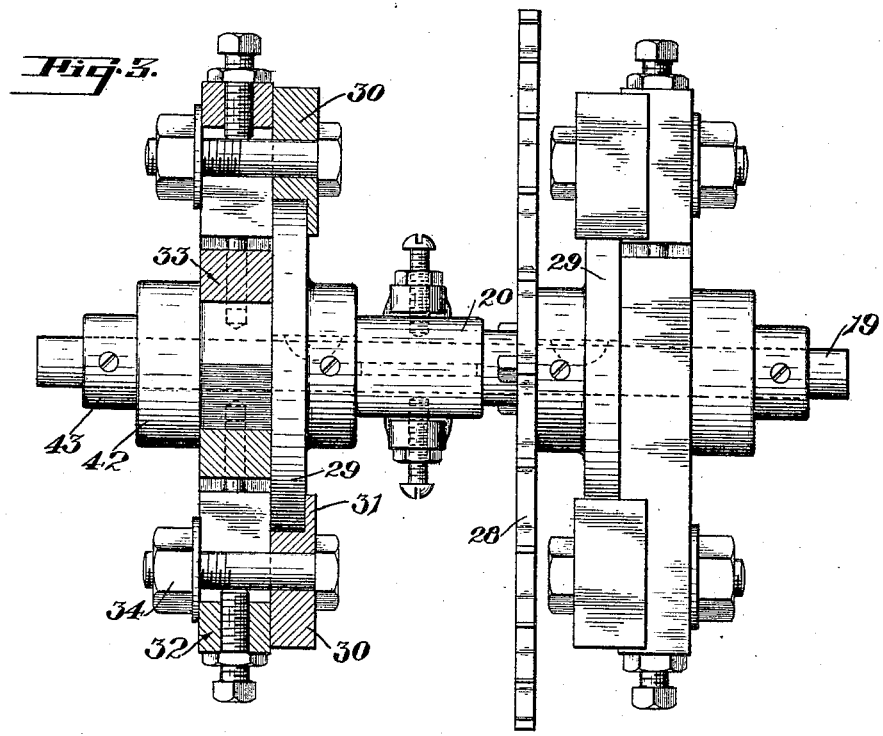
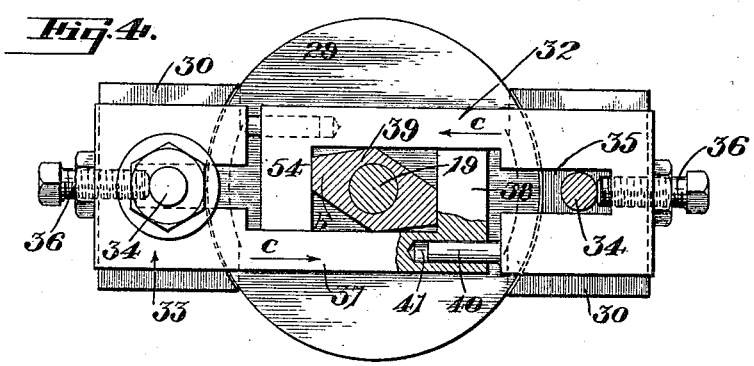
INVENTOR.
OSCAR COOPERMAN.
BY Chas. E. Townsend
ATTORNEY.

Patented Nov. 6, 1923.

1,473,017

UNITED STATES PATENT OFFICE.

OSCAR COOPERMAN, OF PALO ALTO, CALIFORNIA.

BICYCLE TRANSMISSION.

Application filed June 15, 1921. Serial No. 477,713.

*To all whom it may concern:*

Be it known that I, OSCAR COOPERMAN, a citizen of the United States, residing at Palo Alto, in the county of Santa Clara and State of California, have invented new and useful Improvements in Bicycle Transmissions, of which the following is a specification.

This invention relates to a power transmission mechanism and particularly pertains to a bicycle transmission.

It is a principal object of the present invention to provide a transmission mechanism which may be connected to a bicycle, or other pedal operated vehicle and which will produce a compound leverage action by which the bicycle may be more easily propelled, said mechanism being so constructed as to be readily applied to bicycles of present day design; and in addition, being sturdy in build so that the parts are not liable to wear or rapidly get out of order.

The present invention contemplates the use of a pair of walking beams connected to separate clutches and alternately acting to continuously rotate a shaft in a single direction, said beams being operated by the usual pedal cranks of a bicycle;

The invention is illustrated by way of example in the accompanying drawings in which:

Fig. 3 is a view in section in elevation through the transmission mechanism, particularly showing the arrangement of the clutch members;

Fig. 4 is a view in transverse section through one of the clutches showing the construction thereof.

Figure 1:
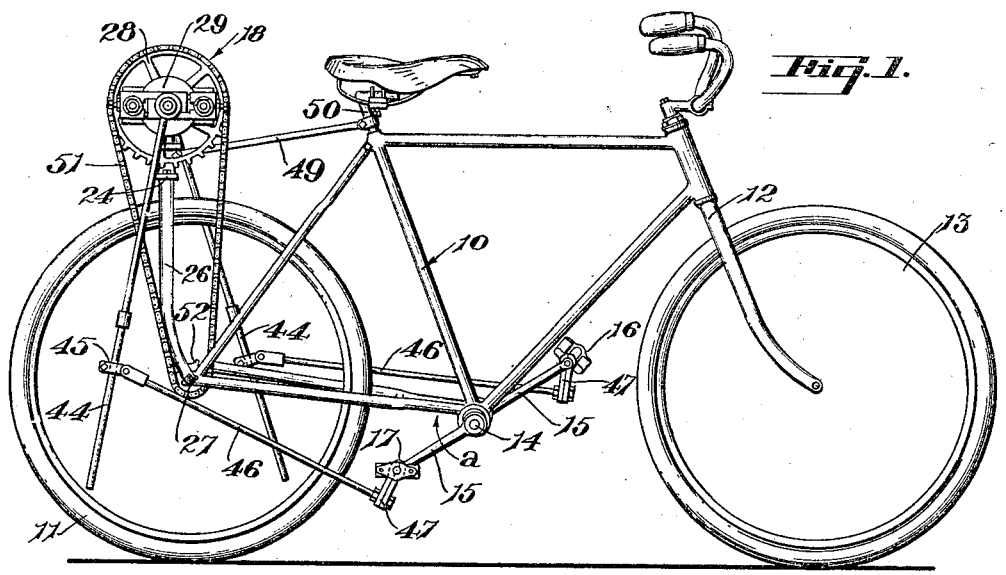
Fig. 1 is a view in side elevation showing the application of the present invention.
Figure 2:
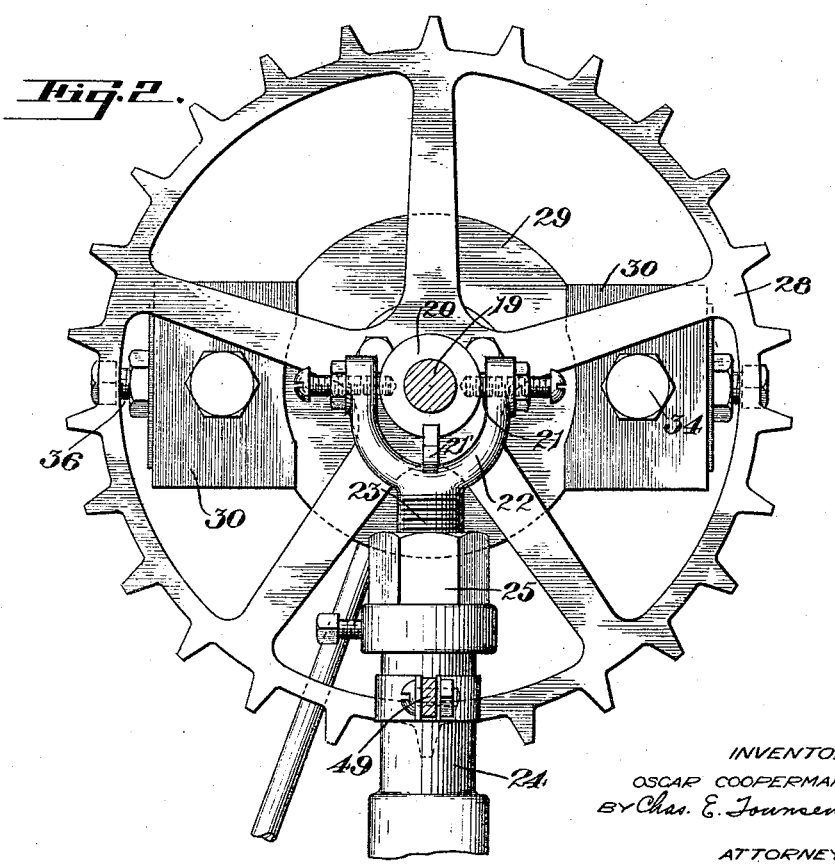
Fig. 2 is an enlarged view in elevation showing the main drive sprocket and the supporting means therefor.

Referring more particularly to the drawing, 10 indicates a bicycle frame of the usual design having a fixed rear fork carrying a rear wheel 11, and a pivoted front fork 12 carrying a front wheel 13. A crank shaft 14 is rotatably mounted in the bottom of the frame and carries pedal cranks 15. These members are equipped with the usual pedals 16 and 17. It will be understood that the construction of the bicycle is not a part of the present invention, and that the invention is more particularly concerned with a transmission mechanism 18 by which motion is imparted to the rear wheel 11 through movement of the pedal cranks 15. The transmission mechanism comprises a horizontal shaft 19 which is rotatably supported in a bearing 20. This bearing is hung between trunnions 21 which extend inwardly from the arms of the fork 22. This allows proper alignment of the bearing while its rotation is further limited by a key 21'. The fork is formed with a threaded shank 23 extending into a supporting frame 24, thus permitting the shank to be adjusted relative to the frame and thereafter set in a locked position by the nut 25. The frame 24 is similar to the front fork of the bicycle, it having arms 26 which extend at opposite sides of the rear wheel and are secured by the rear axle 27.

Mounted upon opposite ends of the shaft 19 are clutch units 20$^a$, which units drive a sprocket 28 secured to the shaft. The units are identical, with the exception that they are right and left handed. Each unit comprises a flat clutch disc 29 which is fixed to the shaft upon opposite sides of the bearing 20. Acting against diametrically opposite sides of the circumferences of the discs are clutch jaws 30. These jaws are formed with friction faces agreeing in contour with the circumference of the discs, and with overhanging flanges 31, as shown in Fig. 3. The jaws are carried on the faces of the operating plates 32 and 33, which plates are shown in Fig. 4. Here it will be seen that the jaws have flanges forming channels into which the ends of the plates are seated. Each of the plates consists of an end portion lying within the channels and held by bolts 34 which pass through openings in the jaws and through slotted openings 35 in the plates. Adjusting screws 36 extend through the ends of the plates to bear against the bolts, thus tending to force the jaws inwardly against the circumference of the discs with any desired pressure; or, in fact, to properly dispose the jaws so that they will normally clear the circumferences of the discs and may be readily drawn thereagainst by means which will be hereinafter described.

Each of the plates is formed with a shank 37 lying in overlapping spaced relation to a similar shank of the complementary plate. The ends of these shanks have inturned lugs 38, which lugs lie parallel to each other and at right angles to the shanks, said lugs having spaced parallel faces against which an operating cam 39 may act. The plates are adapted to be moved toward and away from each other by the action of this cam, and in order to hold these plates in alignment pins 40 are carried by the end portions of the plates and extend into guide passages 41 in the adjacent ends of the complementary plates, thus causing parallel movement of all the parts, as they are actuated.

Reference being had to Fig. 3 it will be seen that the operating cam 39 is fixed to a sleeve 42 which is freely rotatable around the shaft 19. The cam is formed in the shape of a distorted hexagon having parallel end faces normally agreeing with the adjacent faces of the lugs 38 of the plates 32 and 33. The remaining faces of the cams provide sufficient clearance to permit the desired rotation of the member. The sleeve 42 is prevented from moving longitudinally of the shaft by a spacing collar 43. The sleeve 42 of each clutch unit is tapped to receive the threaded end of a walking beam or oscillating lever 44. One of these beams will thus extend down along the opposite sides of the rear wheel of the vehicle frame as clearly shown in Fig. 1. Adjustably mounted at desired points along the length of said beams are set collars 45 to which connecting rods 46 are pivoted. The forward ends of these connecting rods are provided with clamps 47 by means of which they are fixed to the central spindle of the pedals 16 and 17.

In the operation of the present invention the transmission is assembled as shown in the drawings and may thereafter be mounted upon a bicycle frame by attaching the fork 26 to the rear axle 27 and thereafter securing the fork in its upright position by a stay rod 49 which extends forwardly from the upper end of the frame member 24 and is secured to the seat post 50. A sprocket chain 51 is then led around the sprocket 28 and also around a small sprocket 52 by which the rear wheel of the bicycle is directly driven. The bicycle then can be mounted and the crank shafts moved in the direction of the arrow $a$, as indicated in Fig. 1. This will cause the connecting rods 46 to be alternately drawn forward and will produce oscillation of the walking beams 44. The leverage produced may be determined by the point along the walking beams at which the collars 45 are set, it being readily understood that by moving the collars upwardly the leverage will be decreased, and vice versa. When either one of the walking beams is swung forwardly it will tend to rotate the cam 39 associated therewith in the direction of the arrow $b$, as indicated in Fig. 4. This will cause the eccentrically disposed corners 54 of the eccentrics to force against the lugs 38 of the clutch plates, thus simultaneously drawing these plates inwardly in the direction of the arrow $c$, as indicated in Fig. 4, and thereby forcing the arcuated faces of the clutch jaws 30 against the circumferential face of the disc 29 embraced thereby. The adjustment of these jaws may be readily brought about by movement of the adjusting screws 36. Due to the continuous swinging action of the pedal cranks around the axis of the shaft 14 the walking beams will be alternately oscillated in opposite directions, thus insuring that one beam will always be swinging forwardly to grip its associated clutch disc and to rotate the shaft 19 for a partial revolution. At the instant the rear stroke of the walking beam commences, the pressure of the cam will be relieved and the jaws thus released to allow the discs to rotate freely. From the instant the clutch jaws positively engage the discs until the time when the jaws are released, the entire jaw and clutch plate unit will be locked to the disc and will rotate therewith around the longitudinal axis of the shaft 19. This will produce rotation of the shaft and a driving action on the sprocket 18.

It will thus be seen that by the mechanism here disclosed a desired variable compound leverage will be produced by the movement of the pedals of an ordinary bicycle and said power conveniently transmitted to the driving wheel, all of which mechanism is simple in construction, not liable to require repair, and will directly and continuously operate.

While I have shown the preferred form of my invention, I wish it to be understood that various changes may be made by those skilled in the art without departing from the spirit of my invention.

Having thus described my invention, what I claim and desire to secure by Letters Patent is:

1. A clutch mechanism comprising a disc fixed upon a shaft to be driven, a pair of clutch jaws disposed on opposite sides of said disc to engage the circumference thereof, plates slidable relative to each other, one of said jaws being mounted on each of the plates, and a turnable cam rotatably supported between the plates in engagement therewith for moving the plates to simultaneously draw the jaws against the circumference of the disc and produce rotation of the disc with the jaws.

2. A clutch mechanism comprising a disc secured on a shaft to be driven, a pair of clutch jaws disposed on opposite sides of said disc to engage the circumference thereof, a pair of plates slidable relative to each other, one of said jaws being mounted on each plate, a rotatable cam mounted in the same plane as the plates and interposed between the same in engagement therewith for moving the plates to simultaneously draw the jaws against the circumference of the disc and produce rotation of the disc with the jaws, and means for adjusting the jaws relative to the plates and disc.

3. A clutch mechanism comprising a disc fixed upon a shaft to be driven; a pair of clutch jaws adapted to conform to the circumferential contour of the disc on opposite sides thereof; plates sliding relative to each other, one of said jaws being mounted to each of the plates; means for moving the plates to simultaneously draw the jaws against the circumference of the disc, and thereafter bodily rotating the plates and the jaws with the disc and around the axis of said shaft; means for adjusting the jaws relative to the plates and to the circumference of the disc; and a walking beam for actuating said plate moving means.

4. A clutch mechanism comprising a disc fixed upon a shaft to be driven; a pair of clutch jaws adapted to conform to the circumferential contour of the disc on opposite sides thereof; plates sliding relative to each other, one of said jaws being mounted to each of the plates; means for moving the plates to simultaneously draw the jaws against the circumference of the disc, and thereafter bodily rotating the plates and the jaws with the disc and around the axis of said shaft; means for adjusting the jaws relative to the plates and to the circumference of the disc; a walking beam for actuating said plate moving means; and a connecting link adjustably secured to the walking beam for producing oscillation thereof.

5. A clutch mechanism comprising a disc fixed upon a shaft to be rotated, a pair of clutch jaws engageable with opposite sides of the disc, plates slidably connected with each other, one of said jaws being mounted on each plate, a distorted hexagonal cam rotatably supported between and in engagement with the plates and adapted when rotated to simultaneously draw the jaws against the circumference of the disc and produce rotation of the disc with the jaws.

OSCAR COOPERMAN.